United States Patent
Borgne et al.

(10) Patent No.: US 9,545,856 B2
(45) Date of Patent: Jan. 17, 2017

(54) CHILD SAFETY SEAT ALARM

(71) Applicant: JROD TEJAS, LLC, Dallas, TX (US)

(72) Inventors: Rhonda Borgne, Dallas, TX (US); Roy Ramirez, Jr., Oklahoma City, OK (US)

(73) Assignee: JROD TEJAS, LLC, Dallas, TX (US)

( * ) Notice: Subject to any disclaimer, the term of this patent is extended or adjusted under 35 U.S.C. 154(b) by 0 days.

(21) Appl. No.: 14/615,273

(22) Filed: Feb. 5, 2015

(65) Prior Publication Data

US 2015/0332578 A1 Nov. 19, 2015

(51) Int. Cl.
*B60N 2/00* (2006.01)
*G08B 21/22* (2006.01)
*B60N 2/26* (2006.01)

(52) U.S. Cl.
CPC ............ *B60N 2/002* (2013.01); *B60N 2/26* (2013.01); *G08B 21/22* (2013.01)

(58) Field of Classification Search
CPC ............ G08B 21/22; B60N 2/002; B60N 2/26
USPC .......................................... 340/667
See application file for complete search history.

(56) References Cited

U.S. PATENT DOCUMENTS

| | | | |
|---|---|---|---|
| 6,812,844 B1 | 11/2004 | Burgess | |
| 6,922,147 B1 | 7/2005 | Viksnins et al. | |
| 6,924,742 B2 | 8/2005 | Mesina | |
| 7,170,401 B1 | 1/2007 | Cole | |
| 2004/0164856 A1 | 8/2004 | Mesina | |
| 2007/0279206 A1 | 12/2007 | Singfield | |
| 2009/0237229 A1* | 9/2009 | Kautz | B60N 2/2812 340/457 |
| 2009/0303025 A1 | 12/2009 | Wahlstrom | |
| 2012/0007741 A1* | 1/2012 | Laffey, Sr. | B60N 2/002 340/573.1 |
| 2012/0232749 A1* | 9/2012 | Schoenberg | B60N 2/002 701/36 |
| 2014/0015664 A1 | 1/2014 | Watson | |
| 2014/0253313 A1 | 9/2014 | Schoenberg | |
| 2014/0266662 A1 | 9/2014 | Matos | |

OTHER PUBLICATIONS

"PCT Application No. PCT/US2016/016870 International Search Report", Apr. 14, 2016, 9 pages.

* cited by examiner

Primary Examiner — George Bugg
Assistant Examiner — Thang Tran
(74) Attorney, Agent, or Firm — DeLizio Law, PLLC

(57) ABSTRACT

An alarm system can remind or alert an adult about the presence of a child in a vehicle. A child detector, such as a weight sensor or weight-activated circuit, can detect whether a child is occupying the child safety seat. The child detector may be integrated with or coupled to a child safety seat. The child detector can be used in coordination with a vehicle alarm system to remind or alert a driver that a child is occupying the child safety seat when a key is not in the ignition.

22 Claims, 11 Drawing Sheets

CHILD SAFETY SEAT ALARM

BACKGROUND

Embodiments of the present subject matter generally relate to the field of child safety equipment, and, more particularly, to a techniques for integrating a child safety seat with a vehicle alarm system.

Each year, children die from being left unattended in a vehicle. Often a child may be forgotten or left by a driver of the vehicle, such as a caregiver or parent. For example, a driver may neglectfully leave a child in the car while going in for a "quick stop" that takes longer than expected. Alternatively, a driver may simply forget that the child is in the vehicle. For example, the child may fall asleep during a drive and remain quiet for a period of time. Upon arriving at a destination, the driver may be preoccupied or forgetful about the presence of the sleeping child.

Whether the child is left intentionally or unintentionally, being left in a vehicle causes a great risk of injury to the child. The internal weather conditions, such as high temperatures, can cause a fatality in a short period of time. Even when fatality is not the result, a child may be left with serious and possibly permanent injury due to heat exhaustion or dehydration.

It is believed that these tragic accidents can be prevented by a timely reminder to the driver about the presence of a child in the vehicle.

SUMMARY

A driver may be reminded about the presence of a child in the vehicle. In one embodiment, a child safety seat includes a sensor which can detect the presence of the child. The child safety seat can be used in coordination with a vehicle alarm system to remind or alert the driver that the child is in the child safety seat.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
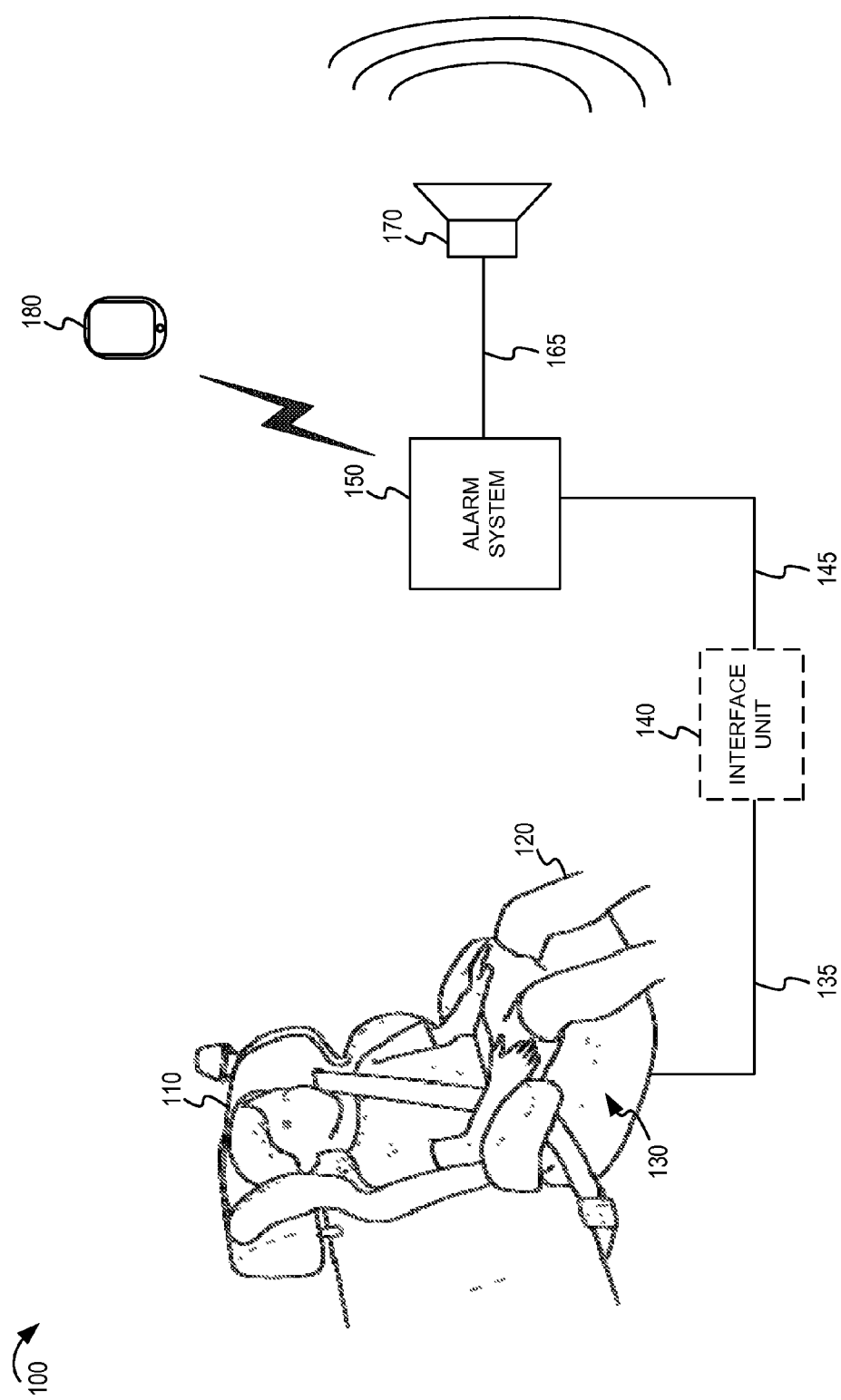
FIG. 1 depicts an example system to introduce concepts of this disclosure.

The description that follows includes exemplary systems, methods, techniques, instruction sequences and computer program products that embody techniques of the present subject matter. However, it is understood that the described embodiments may be practiced without these specific details. In other instances, well-known instruction instances, protocols, structures and techniques have not been shown in detail in order not to obfuscate the description.

Preventing injury or loss of life to a child may be aided by reducing the number of children left in enclosed vehicles. Ultimately, remembering to take a child out of a vehicle may depend on the attentiveness of an adult. This disclosure provides several example embodiments of techniques to remind or alert an adult about the presence of a child in an unattended vehicle. A child detector can be integrated with or coupled to a child safety seat. The child detector is configured to detect whether a child is occupying the child safety seat. A child detector is any device or instrument designed to detect the presence of a child in the child safety seat and provide a signal indicative of the presence. In one example, the child detector may be a weight-activated switch which can open or close an electrical circuit in response to the weight of a child in a child safety seat. Other examples of a child detector are described in FIG. 2.

In one embodiment of the present disclosure, the child detector can be used in coordination with a vehicle alarm system to remind or alert a driver when a child is occupying the child safety seat. There are at least two ways that a driver can be reminded or alerted about the presence of a child in the child safety seat. In one embodiment, the alarm system may sound a preliminary alarm (such as an alert bell or beep) when the key is removed from the ignition and the child detector detects a child is present in the child safety seat. The preliminary alarm may be followed by a louder alarm after a period of time to alert the driver or other persons near the vehicle to check on the cause of the alarm. The alarm system may also be configured to cause transmission of emergency alert message, such as a text message or call. The emergency alert message may be sent via wireless connectivity to the vehicle, such as a cellular connection, satellite service, wireless local area network connection, or the like. For example, the emergency alert message may be a Short Message Service (SMS) message, a Multimedia Messaging Service (MMS), or a data message transmitted via wireless connection. The emergency alert message may alert rescue personnel and/or authorities about the child left in an unattended vehicle.

In another embodiment, the vehicle alarm system may prevent securing a parked vehicle when a child is present. For example, when a driver exits the parked vehicle, the driver may attempt to secure the vehicle by clicking a button on an alarm system remote device (hereinafter referred to as a "fob," or key fob). The typical response after clicking the button is for the alarm system to secure the vehicle. The alarm system may be configured to provide a feedback to the driver to indicate the vehicle is secured, for example the feedback may be a short honk of the horn or flash of the lights. If the driver does not receive the feedback, the driver may be psychologically conditioned to check why the vehicle is not secured. This may occur, for example, when a door is left ajar or a window is open. In this disclosure, the alarm system may also prevent securing the vehicle when a child detector indicates that a child is present. The driver may return to the vehicle to determine why the alarm system did not secure the vehicle and become reminded that the child is present. If the driver does leave the proximity of the vehicle, the alarm system may prevent securing the vehicle so that the child can be extracted by a Good Samaritan or emergency response personnel. If the child remains in the vehicle after a period of time, the alarm system may activate an alarm and/or transmit an emergency alert message.

FIG. 1 depicts an example system 100 to introduce concepts of this disclosure. A child 120 is sitting in a child safety seat 110. The child safety seat 110 is illustrated as a forward facing booster seat. However, in other embodiments, the child safety seat 110 may be a rear-facing baby seat, or any other type of seat that a child 120 may occupy. Other types of seats might include a low profile booster, a custom seat, or the like. In some embodiments, the vehicle may be manufactured with a seat that acts as a child safety seat.

The child safety seat 110 has a child detector 130. For example, the child detector 130 may be integrated into or coupled to a seat portion of the child safety seat 110. The child detector 130 may also be coupled to an alarm system 150 of the vehicle. This disclosure describes many ways that the child detector 130 may be coupled with the alarm system 150. For example, the child detector 130 may electrically couple to one or more inputs of the alarm system 150. In some embodiments, an interface unit 140 may be used to couple the child detector 130 to the alarm system 150. The interface unit 140 may have a first connection 135 to the child detector 130 and a second connection 145 to the alarm system 150. In some embodiments, a portion of the connectivity between the child safety seat 110 and the alarm system 150 may be wireless. For example, the first connection 135 or the second connection 145 may comprise a wireless connectivity. In an example, a vehicle may provide in-car wireless local area network (WLAN), such as IEEE 802.11a/b/g/n or Wi-Fi™. The interface unit 140 may access the alarm system 150 using communication messages via the WLAN. In other embodiments, a portion of the connectivity between the child safety seat 110 and the alarm system 150 may be wired. For example, the child safety seat 110 may be communicatively coupled using a controller area network (CAN) connection, a powerline communications (PLC) connection, or a wired electrical circuit. In yet further examples, the child detector 130 may integrate with the alarm system 150 through an existing sensor already coupled to the alarm system 150. For example, the alarm system 150 may be a legacy system which does not provide an additional input for the child detector 130. However, the child detector 130 may be linked to the alarm system 150 by tapping into a connection between the alarm system 150 and an existing sensor (not shown) in the vehicle.

The alarm system 150 may be coupled (shown as audio output connection 165) to a speaker 170. The speaker 170 may be any apparatus or means for alerting a human, including a horn, a bell, a speaker, a siren, a clicker, or any audio output device. Other examples of apparatus and means for alerting a human may include a head lamp, interior light, dash indicator, a display, a messaging interface, a vibration device, or any type of device which can provide a sensory experience to the human to gain the attention of the human. In this disclosure, example embodiments will be described as utilizing a speaker 170. However, embodiments are not so limited. In other embodiments, other means for alerting the human may be used in lieu of, or in addition to, a speaker.

Also shown in FIG. 1 is a fob 180. A fob refers to any alarm system remote device which can send or receive information to the alarm system 150. In one embodiment, the fob 180 may be a traditional vehicle alarm remote. In another embodiment, the fob 180 may be an application running on an electronic device, such as a smartphone or wearable electronic device. The fob 180 may transmit signals to the alarm system 150 to cause the alarm system 150 to arm or disarm the security features of the vehicle. For example, the alarm system 150 may secure the vehicle by locking the doors. In some embodiments, the fob 180 and alarm system 150 may be capable of two-way communication. For example, the alarm system 150 may be able to send a signal to the fob 180 to alert the user when the alarm system 150 is unable to secure the vehicle. Alternatively, the alarm system 150 may communicate to with the fob 180 to indicate that the alarm system 150 has detected an alarm event.

Having described the system 100, two example scenarios can be described to introduce concepts of alerting a human about the presence of the child. In one example, the alarm system 150 may include a key sensor (not shown) for detecting a removal of a key from an ignition (not shown) of the vehicle. When the key is removed from the ignition, the alarm system 150 may cause a preliminary alarm (such as an alert bell, chime, beep, audible message, or music) if a child is present in the child safety seat. For example, the preliminary alarm may be similar to a beeping alert used to get the attention of a driver regarding an open door, headlamps left on, or driving without a seatbelt. In one embodiment, the preliminary alarm may be a lullaby or verbal message (e.g., "Attention, child detected in child safety seat."). In one embodiment, the preliminary alarm may be sounded immediately upon removal of the key from the ignition. In another embodiment, the preliminary alarm may be sounded after a first delay (for example, a minute) allowing the driver to get out of the vehicle. After the first delay, the preliminary alarm may sound to gain the attention of the driver. After a threshold wait time (e.g., longer than the first delay), the preliminary alarm could be followed by a notification (such as a loud alarm or an emergency alert message) if the child remains in the child safety seat after the threshold wait time. In one embodiment, a delay trigger could be used to temporarily silence the preliminary alarm and/or reset the threshold wait time. The delay trigger could concurrently reset the threshold wait time and temporarily silence the preliminary alarm. The delay trigger may be used to temporarily silence the preliminary alarm to allow the driver more time before sounding the preliminary alarm again. For example, the driver may use the delay trigger to temporarily silence the preliminary alarm while the driver loads groceries or equipment into or out of the vehicle. For example, the delay trigger may be a button or sensor on the vehicle or fob. Alternatively, the delay trigger may be associated with another action on the vehicle, such as a power lift gate or truck latch. However, after the threshold wait time, if the delay trigger has not been pressed, the alarm system 150 may cause a notification. Examples of a notification may include sounding the vehicle alarm, causing transmission of an emergency alert message, broadcasting a distress signal, or the like.

In another example scenario, the alarm system 150 may refrain from securing the vehicle in response to detecting the presence of the child. Based on a signal from the child detector 130, the operation of the alarm system 150 may be modified to prevent an expected result. For example, a command from the fob 180 to the alarm system 150 may be associated with securing the vehicle. The driver, having pressed a button on the fob 180, may expect a confirmatory honk when the vehicle is secured. However, if the child detector 130 provides a signal to the alarm system 150 that indicates a child 120 is present in the child safety seat 110, the alarm system 150 may refrain from securing the vehicle. As a result of the alarm system 150 refraining from securing the vehicle, the driver may not receive the expected confirmatory honk, causing the driver to remember the child. Alternatively, when the alarm system 150 refrains from securing the vehicle, the alarm system 150 may provide an unexpected, different, feedback. For example, the alarm system 150 may honk the horn with four short honks (rather than one short honk indicating the vehicle is secured). When the driver hears the four short honks, the driver may instinctively become aware that the vehicle has not been secured. Upon inspection why the vehicle has not been secured, the driver may be reminded that the child is in the child safety seat.

Figure 2:
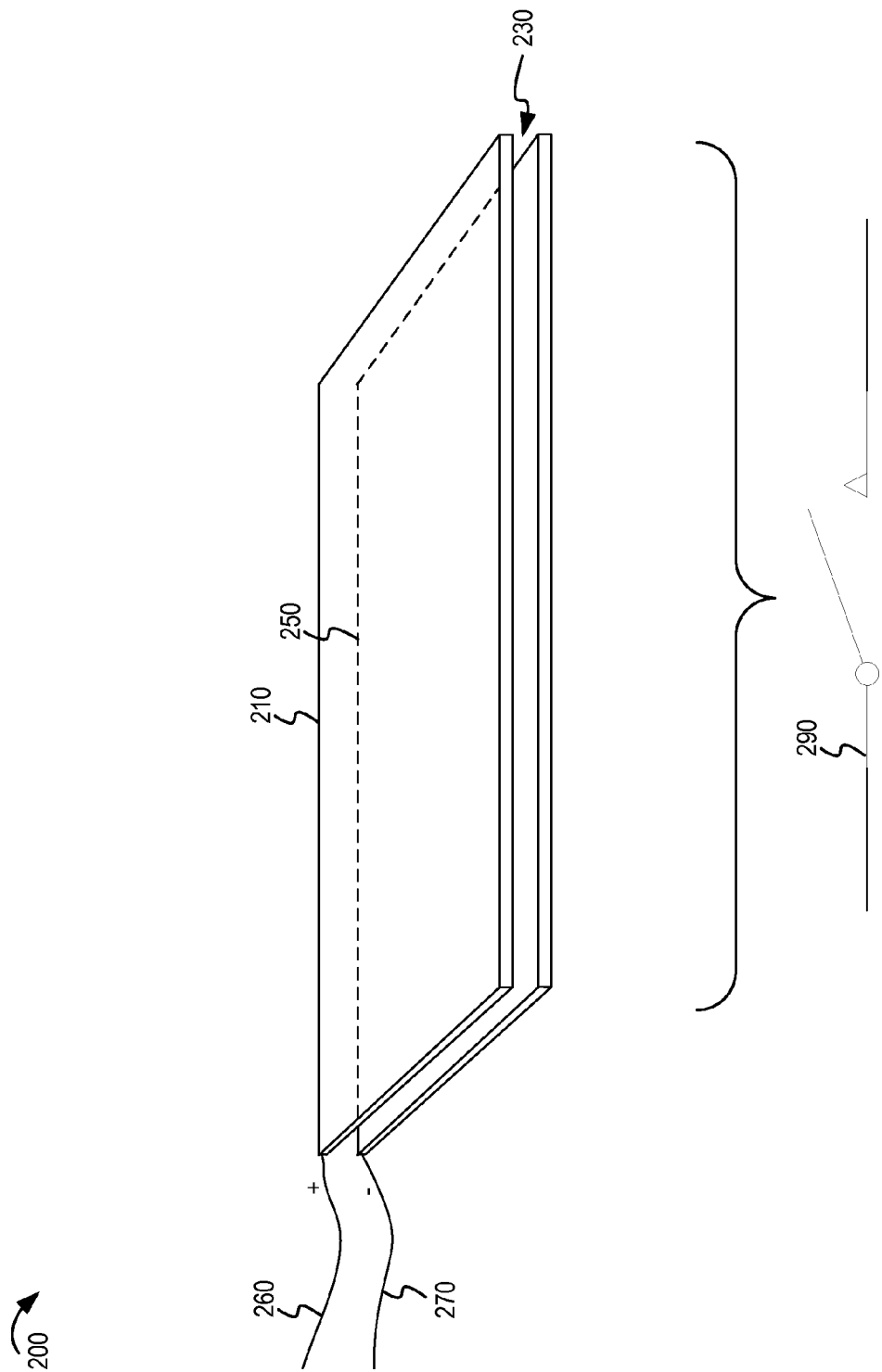
FIG. 2 depicts a conceptual illustration of a child detector in accordance with an embodiment of this disclosure.

FIG. 2 depicts a conceptual illustration of a child detector 200 in accordance with an embodiment of this disclosure. The child detector 200 described in FIG. 2 is only one example of many different embodiments of child detectors within the scope of this disclosure. For example, a child detector may include a pressure-activated switch, a weight sensor, a weight-sensitive switch, or any other type of sensor that can be used to determine whether a child is present in a child safety seat.

The child detector 200 includes a first surface 210 (which may also be referred to as a contact plate, contact surface, or the like) and a second surface 250. In the example of FIG. 2, the first surface 210 and the second surface 250 may comprise conductive surfaces and may be separated by a non-conductive separation 230. For example, a spring or other material could separate the first surface 210 and the second surface 250 when a weight is not forcing the first surface 210 to contact the second surface 250. When a weight (such as the weight of a child) applies a downward force on the first surface 210, the non-conductive separation 230 may compress, such that at least a portion of the first surface 210 comes into contact with at least a portion of the second surface 250. The first surface 210 may be coupled to a first wire 260 and the second surface 250 may be coupled to a second wire 270. So when the portion of first surface 210 comes into contact with the portion of the second surface 250, the first and second wires may form a conductive circuit (also referred to as a "closed" circuit, in contrast to an "open" circuit when the wires do not form a conductive circuit).

In an alternative embodiment, the child detector 200 may be configured so that when weight is not applied, the first and second wires form a closed circuit, and when weight is applied, the first and second wires form an open circuit. The toggling of the open and closed circuits may be logically referred to as a switch 290. The switch 290 may be a binary state (e.g., open and closed, or "on" and "off"). One of the first and second wires may be associated with a negative electricity source, while the other may be associated with a positive electricity return. When the first surface 210 comes into contact with the second surface 250, the electricity may flow through the circuit. The flowing electricity may be detected as a signal indicative of the presence of a child detected by the child detector 200.

Although the example in FIG. 2 represents a child detector 200 with a binary state, other types of child detectors may be more sophisticated. For example, the child detector may measure a weight and provide a representation of the measured weight in the form of a message or a variable output voltage. In another example, the child detector may comprise a pressure-activated switch at the rear or side of the child safety seat, responsive to a backward or sideways force caused by a child in the child safety seat.

In addition to the examples of child detectors previously described, other child detectors could comprise other types of sensors. Examples of other types of sensors that could be used in the child detector may include a motion detector, a contact detector, a buckle latch detector, an infrared sensor, a proximity sensor, or the like. A contact detector may contact of a body against the contact detector. The buckle latch detector may detect whether a buckle of a seatbelt or harness is latched. An infrared sensor may detect the temperature range of a human child in a seat portion of the child safety seat. A proximity sensor is a sensor able to detect the presence of nearby objects without any physical contact. For example, a proximity sensor can emits an electromagnetic field or a beam of electromagnetic radiation (infrared, for instance), and looks for changes in the field or return signal. In one embodiment a proximity sensor can have a high reliability and long functional life because of the absence of mechanical parts and lack of physical contact between the proximity sensor and the child. In another example, an in-vehicle camera may be used as a child detector. For example, vehicles may be equipped with a rear seat camera (such as for passenger safety or for passenger video calling). A processor may analyze images from the camera to determine whether a child is in the child safety seat.

For brevity, the child detector shown in the following figures are illustrated similarly as the child detector 200. However, any type of child detector may be substituted for the child detector 200 in the following figures. FIGS. 3-7 describe several example embodiments of coupling a child detector to an alarm system of a vehicle. In some implementations, the manufacturer of the vehicle may be different from the manufacturer of the child detector. For example, the child detector may be integrated into a child safety seat by a manufacturer of the child safety seat, different from a manufacturer of the vehicle. In some implementations, the child detector can be coupled to an existing alarm system included in the vehicle by the manufacturer of the vehicle. In other implementations the child detector may include or couple to a separate alarm system (which may be referred to as a redundant alarm system) that is different from an alarm system originally manufactured into a vehicle. In some implementations, a manufacturer of the vehicle may include connector ports or interfaces to facilitate coupling the child detector. For example, a vehicle may be equipped with an industry standardized connection to facilitate connections from child detectors sold by different manufacturers. The "Lower Anchors and Tethers for Children (LATCH) Restraint System" is an example of an industry standardized connection for securing a car seat to a vehicle. A similar industry standardized system could be used to establish consistent interface ports for a child detector to integrate into a vehicle alarm system.

Figure 3:
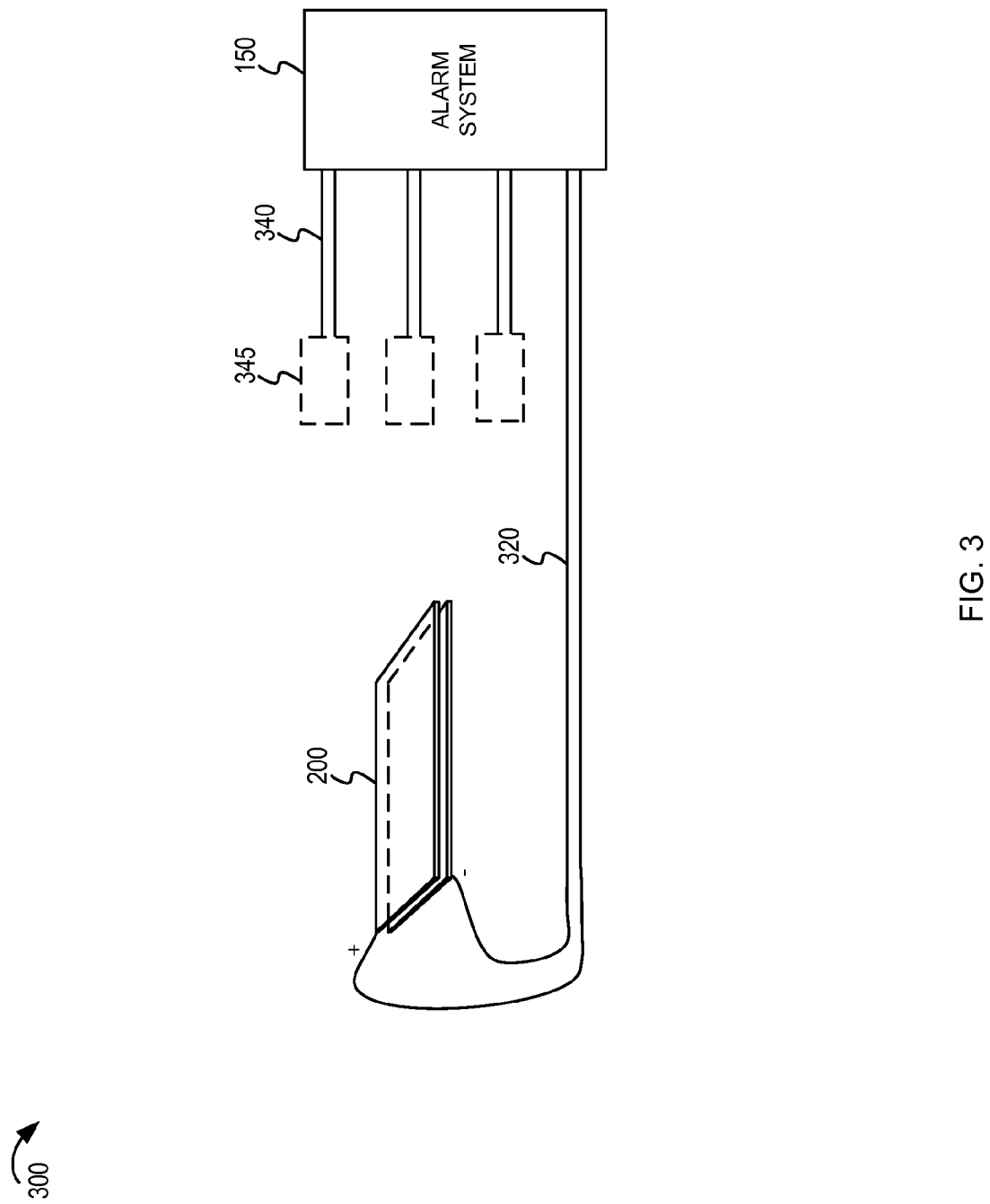
FIG. 3 depicts an example of integrating a child detector with a vehicle alarm system using a direct connection in accordance with an embodiment of this disclosure.

FIG. 3 depicts an example 300 of integrating a child detector 200 with an alarm system 150 using a direct connection in accordance with an embodiment of this disclosure. In FIG. 3, the alarm system 150 includes a plurality of input ports which can receive inputs from a plurality of sensors. For example a first sensor 345 may be connected via a first circuit 340 to the alarm system 150. The first circuit 340 may comprise a two wire loop which has the first sensor 345 in the circuit. The first sensor 345 might be, for example, a door sensor which detects whether a door of the vehicle is open or closed. Depending on whether the door is open or closed, the first circuit 340 may be an open circuit or a closed circuit. The open circuit may not conduct electricity, while the closed circuit can conduct electricity. The alarm system 150 may have electrical components which utilize the conductivity of the first circuit 340 to determine whether the vehicle can be secured or not.

Returning to the child detector 200, in FIG. 3, a direct circuit 320 may plug into an available port of the alarm system 150. For example, the alarm system 150 may provide an auxiliary port that is available for auxiliary sensors. The child detector 200 may be coupled to the alarm system 150 by directly connecting one or more wires into the auxiliary port. This may be used, for example, when the alarm system 150 is manufactured and integrated with the vehicle, while the child detector 200 is manufactured and integrated with a child safety seat that is installed by a consumer.

Figure 4:
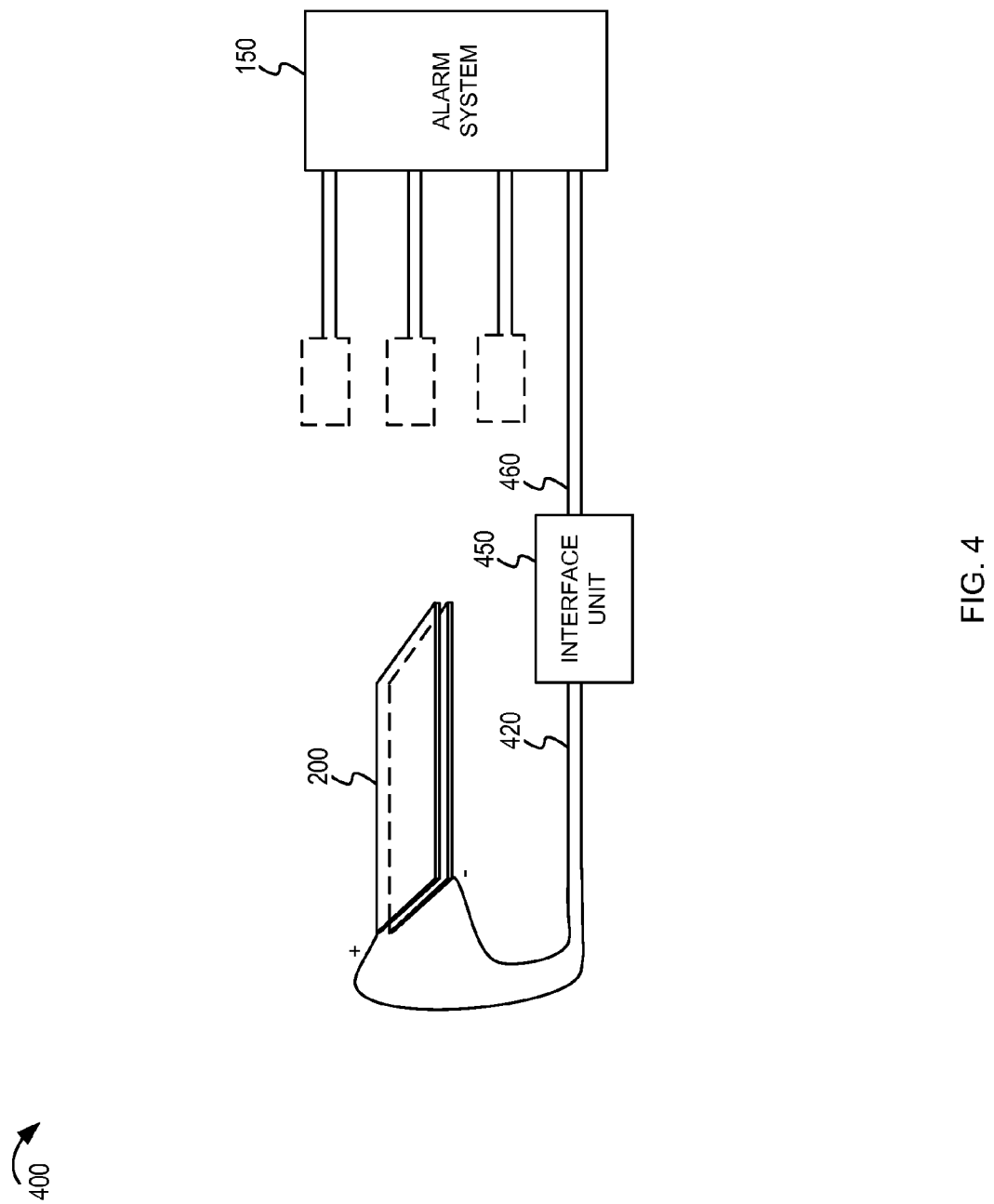
FIG. 4 depicts an example of integrating a child detector with a vehicle alarm system using an interface unit in accordance with an embodiment of this disclosure.

FIG. 4 depicts an example 400 of integrating a child detector 200 with an alarm system 150 using an interface unit 450. The interface unit 450 may be used to integrate the child detector 200 with different types of alarm systems. For example, depending on the manufacturer of the alarm system 150, the interface unit 450 may provide different connection options. The interface unit 450 may receive a signal from the child detector 200 via a detector circuit 420, and may provide an output to the alarm system 150 via an alarm sensor circuit 460. The interface unit 450 may also include a transformer circuit (not shown) which converts or transforms the signal from the child detector 200 into a form that is useful for the alarm system 150. For example, the interface unit 450 may receive, from the child detector 200, a signal indicative of the presence of the child. The interface unit 450 may produce a first output when the child is present, and produce a second output when the child is not present. The first output or the second output may be provided via the alarm sensor circuit 460 to the alarm system 150.

If the detector circuit 420 is a binary state, but is opposite of the form needed by the alarm system 150, the interface unit 450 may cause an inverse circuit state in the alarm sensor circuit 460. For example, when the child is sitting on a weight-sensitive switch, the child detector 200 may produce a closed circuit in the detector circuit 420. However, the alarm system 150 may associate an error condition with an open circuit. In that scenario, the interface unit 450 may cause an open circuit condition on the alarm sensor circuit 460 in response to detecting the closed circuit condition on the detector circuit 420.

In another embodiment, the interface unit 450 may include a processor for determining a weight measurement or voltage level from the child detector 200. Depending on the capabilities of the alarm system 150, the interface unit 450 may produce a message, circuit condition, or other form of communication to influence the operation of the alarm system 150 based on the signal from the detector circuit 420. In the example where the alarm system 150 includes a communications system and processor, the interface unit 450 may communicate with the alarm system 150 using a wired or wireless communications protocol understood by the alarm system 150.

Figure 5:
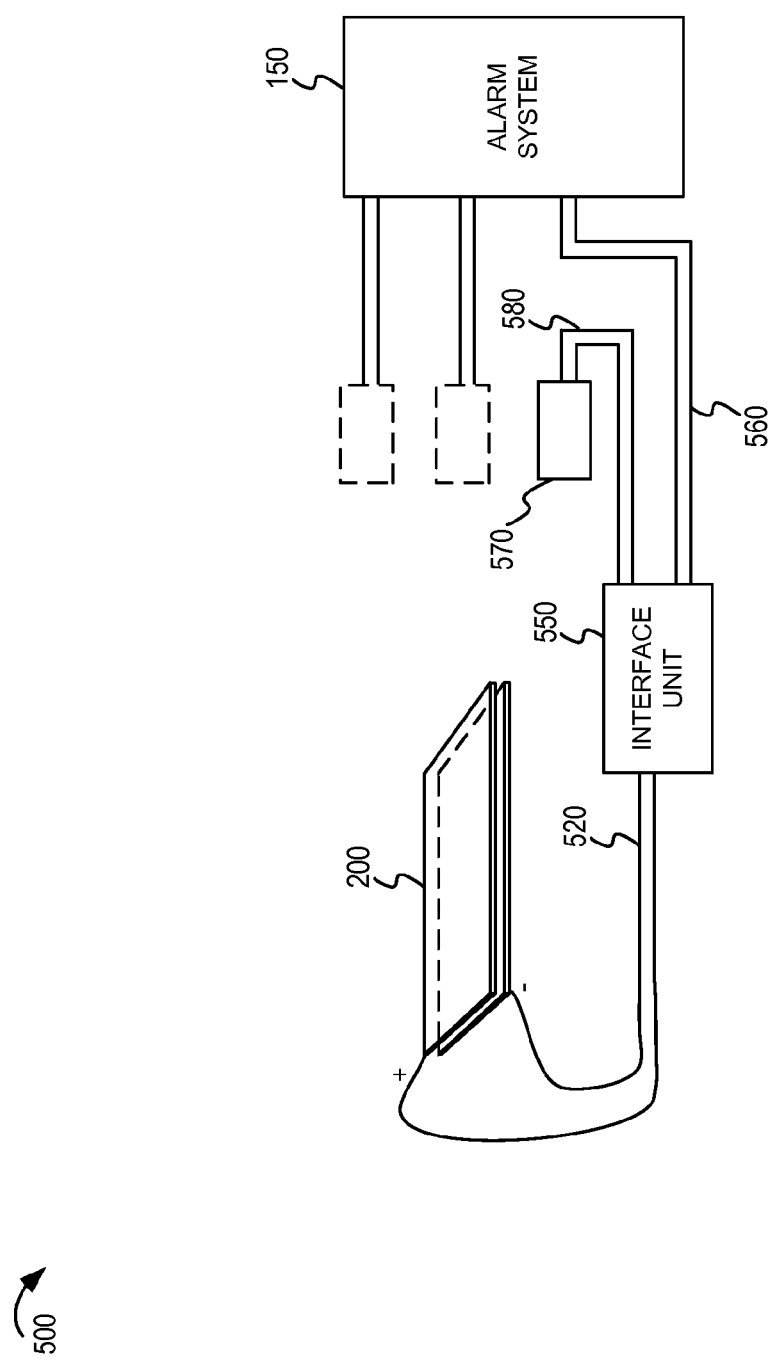
FIG. 5 depicts an example of integrating a child detector with a vehicle alarm system using an existing sensor circuit in accordance with an embodiment of this disclosure.

FIG. 5 depicts an example 500 of integrating a child detector 200 with an alarm system 150 using an existing circuit to a first sensor 570. The interface unit 550 may receive an input from a detector circuit 520 and a first sensor circuit 580 and provide an output to the alarm system 150 via an alarm sensor circuit 560. For example, prior to installing the interface unit 550 in the vehicle, the first sensor 570 may have an existing circuit (not shown) to the alarm system 150. To install the child detector 200 and interface unit 550, the child detector 200 may be integrated with an existing circuit. For example, the existing circuit may be cut so that a first portion of the existing circuit becomes the first sensor circuit 580 to the interface unit 550 and a second portion of the existing circuit becomes the alarm sensor circuit 560. However, the interface unit 550 may combine (or otherwise utilize) both of the first sensor circuit 580 and the detector circuit 520 to determine the circuit condition that should be provided via alarm sensor circuit 560.

The interface unit 550 in FIG. 5 might be useful when coupling a child detector 200 to the alarm system 150 without modifying the alarm system 150 itself. For example, the interface unit 550 may utilize an existing circuit to a door sensor or window sensor of a vehicle. The alarm system 150 may already be preprogrammed (by an alarm system manufacturer) to prevent securing the vehicle, or withhold confirmatory feedback, when a door or window is open. The same existing circuit could be used to simulate an open door or window when the child detector 200 detects a child is present. In one example, when either the door is open or the child is present, the alarm system 150 may prevent the confirmatory feedback or may provide an alternative feedback (such as four short honks) to indicate a problem with securing the vehicle. As a result of using the existing circuit, an alarm system in an older vehicle could be used with the child detector 200 and interface unit 550.

Figure 6:
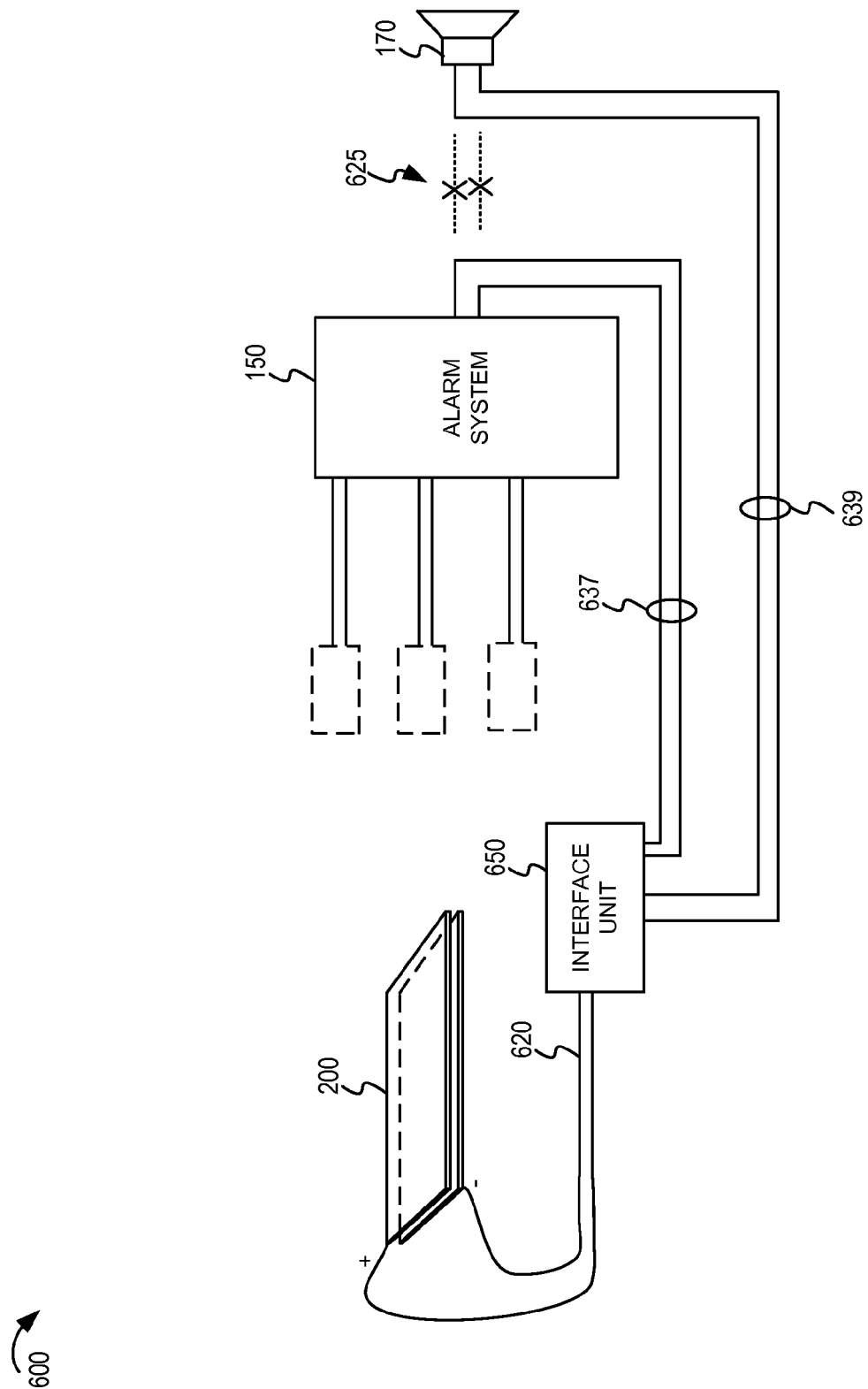
FIG. 6 depicts an example of integrating a child detector with a vehicle alarm system using a bypass circuit in accordance with an embodiment of this disclosure.

FIG. 6 depicts an example 600 of integrating a child detector 200 with an alarm system 150 using a bypass circuit. In the example 600, the interface unit 650 may bypass a controller of the alarm system 150 and instead influence operation of the speaker 170 directly. The alarm system 150 may have a wire pair 625 to the speaker 170. To install the interface unit 650 one or more wires of the wire pair 625 may be cut and a first portion of the wire pair 625 may become an alarm wire pair 637 from the alarm system 150 to the interface unit 650. A second portion of the wire pair 625 may become a speaker wire pair 639 from the interface unit 650 to the speaker 170. The interface unit 650 may be configured to send signals via the speaker wire pair 639 responsive to either the alarm wire pair 637 or a detector circuit 620.

Figure 7:
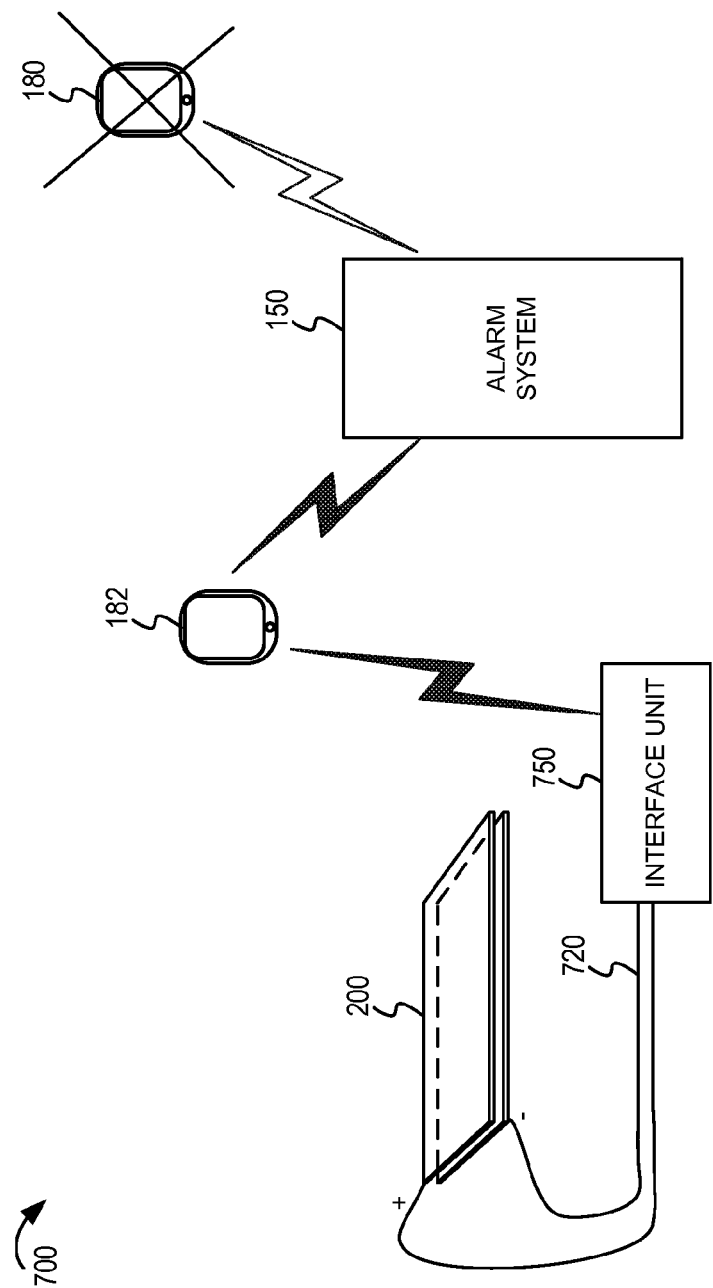
FIG. 7 depicts an example of integrating a child detector with a vehicle alarm system using a replacement fob in accordance with an embodiment of this disclosure.

FIG. 7 depicts an example 700 of integrating a child detector 200 with an alarm system 150 using a replacement fob 182 to replace the fob 180. The replacement fob 182 may be configured to communicate with the alarm system 150 similarly to how the original fob 180 communicated with the alarm system 150. However, different from the original fob 180, the replacement fob 182 may also be responsive to a signal from an interface unit 750. The interface unit 750 may have a detector circuit 720 coupled to the child detector 200. The interface unit 750 may send a signal to the replacement fob 182 to indicate when the child is detected by the child detector 200. When a button on the replacement fob 182 is pressed, if the signal from the interface unit 750 is detected, the replacement fob 182 may refrain from sending a command to the alarm system 150 to secure the vehicle.

Alternatively, instead of sending the signal when a child is detected, the interface unit 750 may send a signal to indicate that a child is not detected. In other words, when the signal is provided, the replacement fob 182 may send the command to the alarm system 150 to secure the vehicle. In the absence of the signal from the interface unit 750, the replacement fob 182 may not send the command to the alarm system 150. In this scenario, absence of the signal may be due to a child being detected by the child detector 200, due to distance between the interface unit 750 and the replacement fob 182, and/or due to a low power condition of the interface unit 750. Regardless of the reason, the replacement fob 182 can be prevented from sending a command to the alarm system 150 to secure the vehicle. The replacement fob 182 may include a vibration unit, display, or other apparatus to provide a short alert to the user that the signal is absent. However, the short alert on the replacement fob 182 may discontinue after a period of time or in response to a user input, so that the short alert does not drain a battery of the replacement fob 182 when a driver and child are both away from the vehicle.

Figure 8:
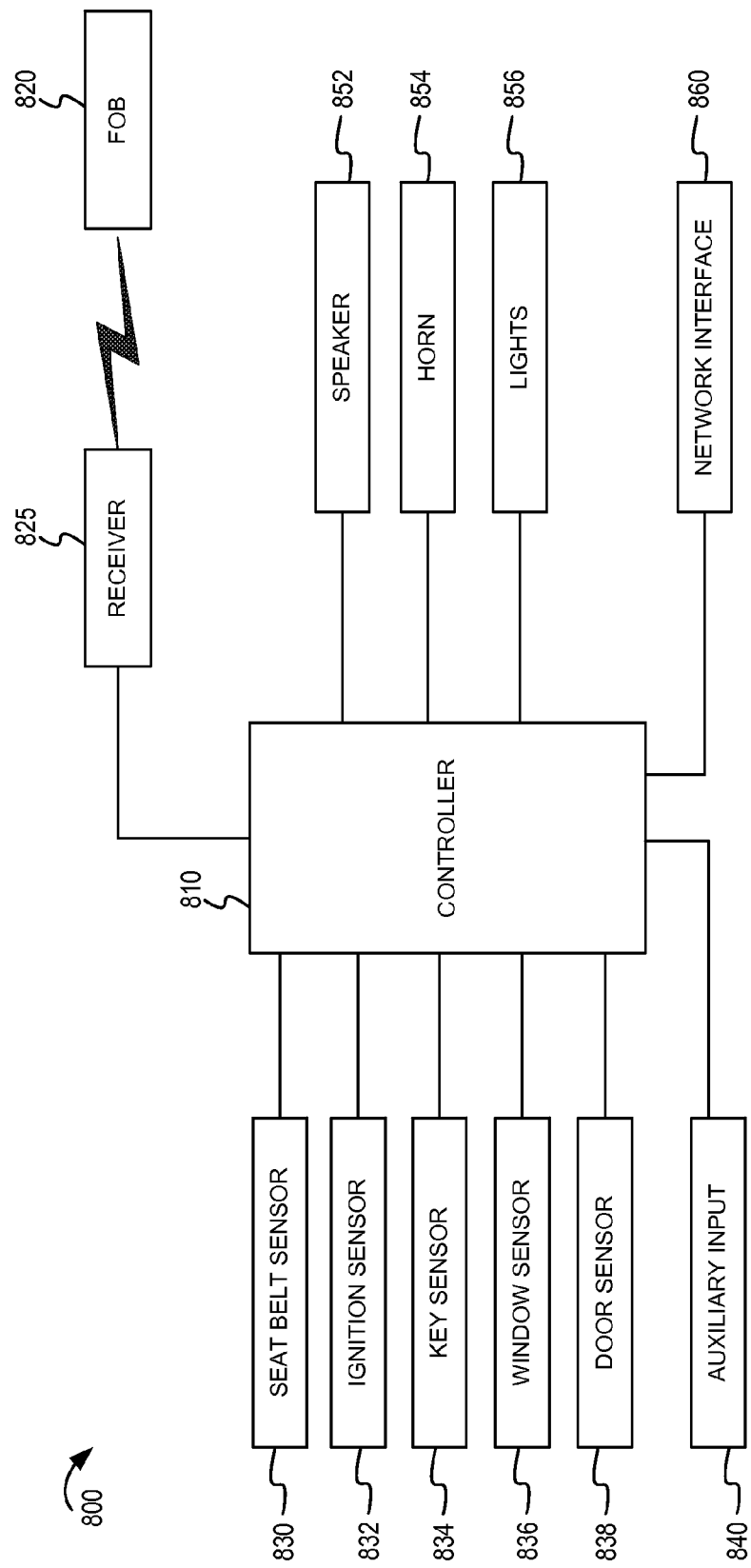
FIG. 8 depicts aspects of a vehicle alarm system in accordance with an embodiment of this disclosure.

FIG. 8 depicts aspects of an alarm system 800 in accordance with an embodiment of this disclosure. The alarm system 800 includes a controller 810. The controller 810 may be manufactured with analog circuitry, digital processor, or any combination of analog and digital components. The controller 810 may implement logic about when and how to cause alarms for a user. The controller 810 may take inputs from a variety of sensors. The alarm system 800 illustrates several input ports 830-840 for various sensors. A first input port 830 may be coupled to a seat belt sensor. A second input port 832 may be coupled to an ignition sensor (to determine whether the engine is running). A third input port 834 may be coupled to a key sensor to determine whether a key is in the ignition. A fourth input port 836 may be coupled to a window sensor. A fifth input port 838 may be coupled to a door sensor. An auxiliary input port 840 may allow for an auxiliary input to the controller 810. Each of the input ports 830-840 in FIG. 8 are provided as examples, and may or may not be present in various implementations.

The controller 810 may also have output ports to control various types of alarms. For example, output ports 852-860 may include a first output port 852 to a speaker, a second output port 854 to a horn, and/or a third output port 856 to control the one or more lights associated with the vehicle. A network interface 860 may also be considered an output port and may be utilized to transmit an emergency alert message via cellular, satellite, or other wireless networks.

The controller 810 may be controlled, at least partially, by a fob 820 that wirelessly communicates with a receiver 825 coupled to the controller 810. The fob 820 can send a command associated with securing the vehicle to the receiver 825. The controller 810 may process the command and determine whether to secure the vehicle based on one or more of the input ports 830-840. In an embodiment of this disclosure a signal indicative of the presence of a child in a child safety seat is provided via one of the input ports to the controller 810. An interface unit (not shown) may also be in the path between a child detector and the controller 810. If a child is present, the controller 810 may refrain from securing the vehicle. The controller 810 may also send an alert via one of the output ports 852-860 if the child remains in the vehicle more than a threshold wait time after a key is removed from the ignition.

Figure 9:
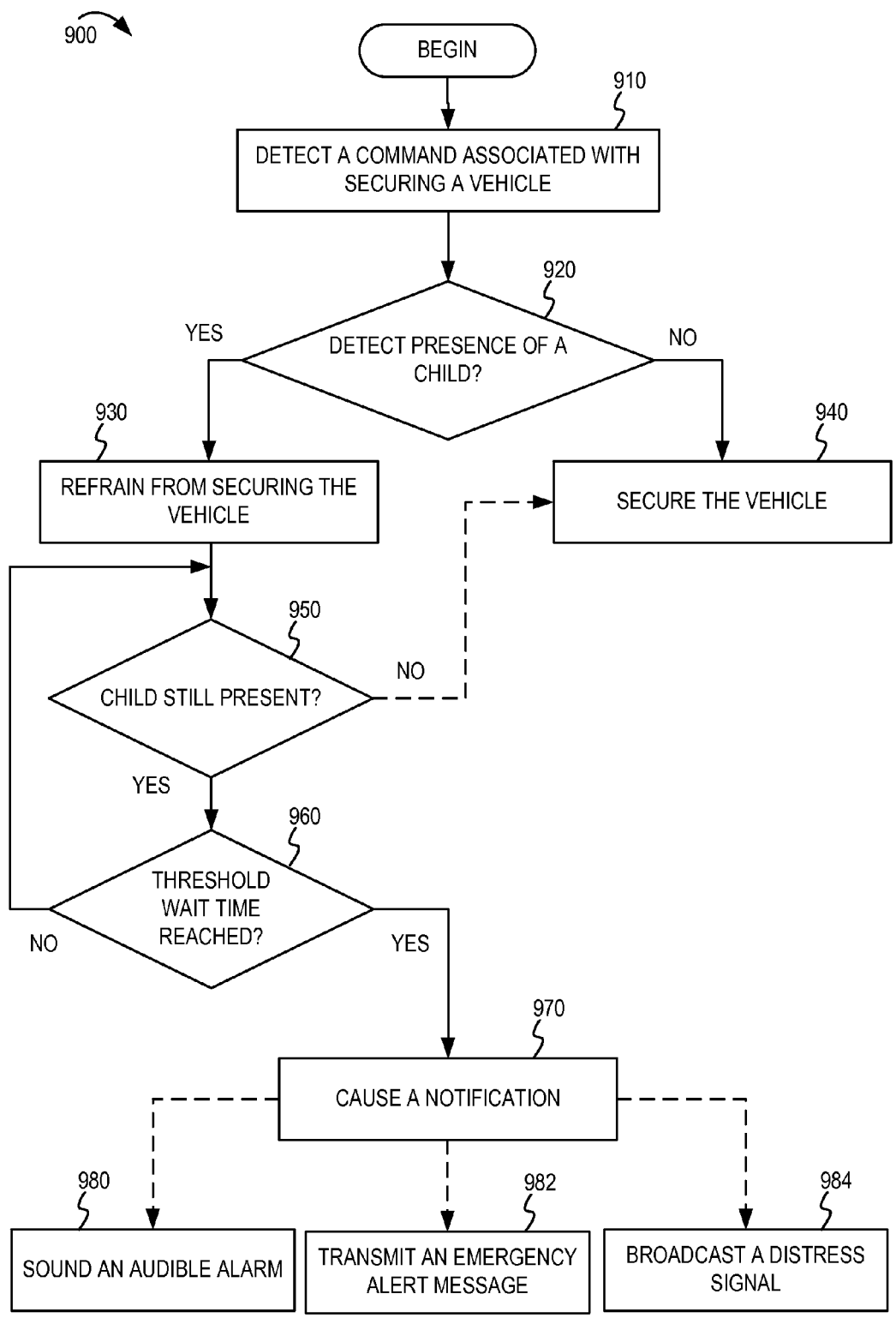
FIG. 9 depicts a flow chart for preventing a vehicle alarm system from securing the vehicle in accordance with an embodiment of this disclosure.

FIG. 9 depicts a flow chart 900 for preventing a vehicle alarm system from securing the vehicle in accordance with an embodiment of this disclosure.

Beginning at block 910, an alarm system of a vehicle may detect a command associated with securing the vehicle. For example, the command may be detected responsive to a user activation of a fob associated with the alarm system.

At decision 920, the alarm system may determine whether a child detector detects a presence of a child occupying a child safety seat in the vehicle. If the child detector does not detect the presence of the child, the flow chart 900 continues to block 940 where the alarm system secures the vehicle. If the child detector does detect the presence of the child, the flow chart 900 continues to block 930.

At block 930, the alarm system may refrain from securing the vehicle in response to determining that the child detector detects the presence of the child. The alarm system may then begin a timer or counter to monitor how long the child is present in the vehicle after a key is removed from the ignition.

At decision 950, the alarm system may determine whether the child detector still detects the presence of the child occupying the child safety seat. If the alarm system determines that the child detector does not detect the presence of the child occupying the child safety seat, the flow chart 900 continues to block 940, where the alarm system secures the vehicle. If the alarm system determines that the child detector still detects the presence of the child occupying the child safety seat, the flow chart 900 continues to decision 960.

At decision 960, the alarm system determines whether the child detector detects the presence of the child for more than a threshold wait time. For example, the alarm system may compare the timer or counter to the threshold wait time. Alternatively, the alarm system may determine that the timer or counter has expired. If the threshold wait time has not been reached, the flow chart 900 returns to block 930 or decision 950 to continue refraining from securing the vehicle and monitoring the presence of the child. If the threshold wait time has been reached, the flow chart 900 continues to block 970.

At block 970, the alarm system may cause a notification, in response to determining that the child detector detects the presence of the child for more than the threshold wait time. There are several types of notifications which could be caused, either separately or in combination. For example, at block 980, the alarm system may sound an audible alarm. At block 982, the alarm system may transmit an emergency alert message. The emergency alert message may be sent to an emergency agency (such as a public service answering point, PSAP, or "911" center), to police authorities, and/or to a parent associated with the vehicle or child. In some examples, the vehicle may be equipped with a wireless data connection via cellular, satellite, or WLAN connectivity. The alarm system may send the emergency alert message via the wireless data connection. At block 984, the alarm system may broadcast a distress signal.

Figure 10:
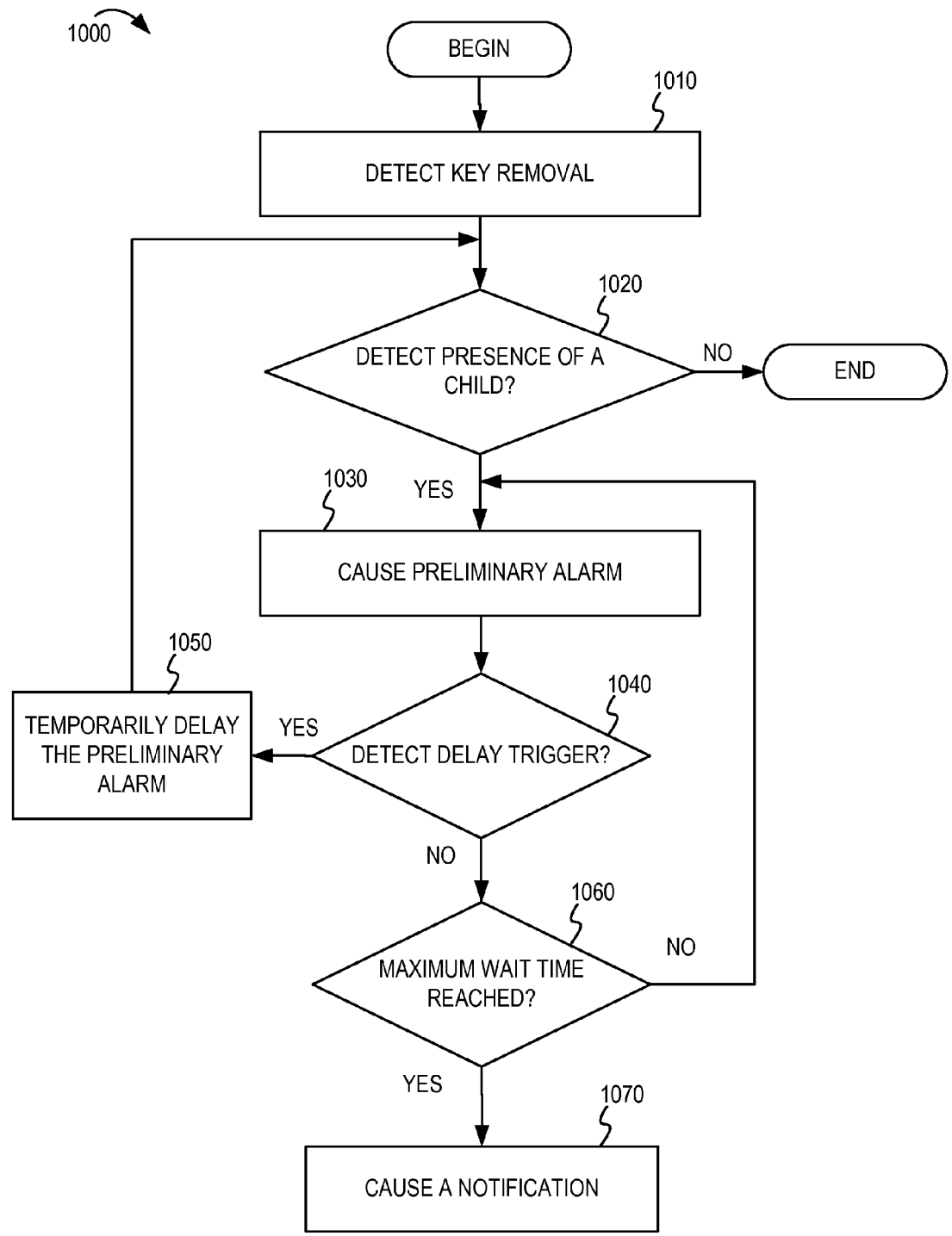
FIG. 10 depicts a flow chart for alerting one or more persons near the vehicle in accordance with an embodiment of this disclosure.

FIG. 10 depicts a flow chart 1000 for alerting one or more persons near the vehicle in accordance with an embodiment of this disclosure.

At block 1010, an alarm system may detect removal of a key from an ignition of the vehicle.

At decision 1020, the alarm system may determine whether a child detector detects a presence of a child occupying a child safety seat in the vehicle. If presence of the child is not detected, the flow chart 1000 may simply end. However, if presence of the child is detected, the flow chart 1000 continues to block 1030.

At block 1030, the alarm system may cause a preliminary alarm in response to determining that the child detector detects the presence of the child and in response to detecting the removal of the key.

At decision 1040, the alarm system may determine if a delay trigger has detected a user activation associated with silencing the preliminary alarm. If the user activation is detected, the flow chart 1000 continues to block 1050. If no user activation is detected, the flow chart 1000 continues to decision 1060.

At block 1050, the alarm system may temporarily silence the preliminary alarm in response to the user activation of the delay trigger.

At decision 1060, the alarm system determines whether the child detector detects the presence of the child for more than a threshold wait time. For example, the alarm system may compare the timer or counter to the threshold wait time. Alternatively, the alarm system may determine that the timer or counter has expired. If the threshold wait time has not been reached, the flow chart 1000 returns to block 1030 or decision 1020 to continue the preliminary alarm. If the threshold wait time has been reached, the flow chart 1000 continues to block 1070.

At block 1070, the alarm system may cause a notification, in response to determining that the child detector detects the presence of the child for more than the threshold wait time. Similar to FIG. 9, there are several types of notifications which could be caused, either separately or in combination.

FIGS. 1-10 and the operations described herein are examples meant to aid in understanding various embodiments and should not be used to limit the scope of the claims. Embodiments may perform additional operations, fewer operations, operations in parallel or in a different order, and some operations differently. While this disclosure enumerates several embodiments, additional embodiments are considered within the scope of this disclosure.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "unit" or "system." Furthermore, aspects of the present disclosure may take the form of a computer program product embodied in one or more computer readable medium(s) having computer readable program code embodied thereon.

Any combination of one or more computer readable medium(s) may be utilized, with the sole exception being a transitory, propagating signal. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of the present disclosure may be written in any combination of one or more programming languages, including an object oriented programming language such as Java, Smalltalk, C++ or the like and conventional procedural programming languages, such as the "C" programming language or similar programming languages.

Aspects of the present disclosure are described with reference to flow diagrams and/or block diagrams of methods, apparatus (systems) and computer program products according to embodiments of the present disclosure. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagrams and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 11:
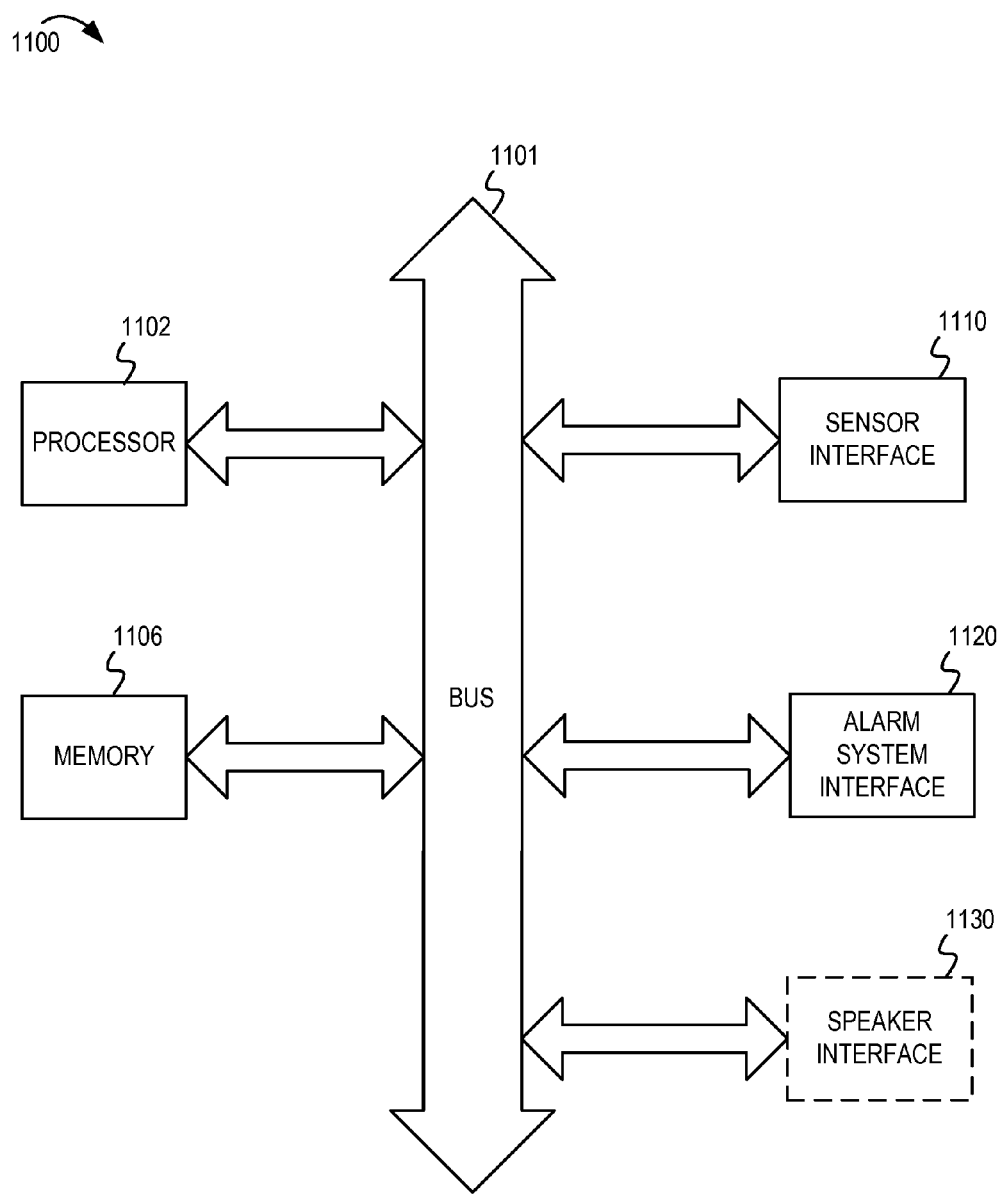
FIG. 11 depicts an apparatus for implementing various embodiments of this disclosure.

FIG. 11 is an example block diagram of one embodiment of an electronic device 1100 capable of implementing various embodiments of this disclosure. In some implementations, the electronic device 1100 may be a child safety seat or an interface unit for coupling a child safety seat to an alarm system. The electronic device 1100 includes a processor 1102 (possibly including multiple processors, multiple cores, multiple nodes, and/or implementing multi-threading, etc.). The electronic device 1100 includes a memory 1106. The memory 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 1100 also includes a bus 1101 (e.g., PCI, ISA, PCI-Express, HyperTransport®, InfiniBand®, NuBus, AHB, AXI, etc.). In some implementations, the bus 1101 may be a CAN bus or other in-vehicle communication bus. The electronic device may include one or more network interfaces (not shown) that may be a wireless network interface (e.g., a WLAN interface, a Bluetooth® interface, a WiMAX interface, a ZigBee® interface, a Wireless USB interface, etc.) or a wired network interface (e.g., a powerline communication interface, an Ethernet interface, etc.).

The memory 1106 may store instructions to implement embodiments described above. The memory 1106 may include instructions which, when executed by the processor 1102, cause the electronic device 1100 to perform one or more features described in this disclosure. Any one of these functionalities may be partially (or entirely) implemented in hardware and/or on the processor 1102. Further, realizations may include fewer or additional components not illustrated in FIG. 11 (e.g., video cards, audio cards, additional network interfaces, trait capture devices, etc.). The processor 1102, and the memory 1106, may be coupled to the bus 1101. Although illustrated as being coupled to the bus 1101, the memory 1106 may be directly coupled to the processor 1102.

The electronic device 1100 may include a sensor interface 1110 and an alarm system interface 1120. For example, the sensor interface 1110 may couple to a child detector, such as those described above. The alarm system interface 1120 may couple to a vehicle alarm system. In another embodiment, the sensor interface 1110 may include a speaker interface 1130, capable of coupling the electronic device 1100 to a means for alerting a human, such as a speaker of a vehicle.

While the embodiments are described with reference to various implementations and exploitations, it will be understood that these embodiments are illustrative and that the scope of the present subject matter is not limited to them. In general, a child safety seat alarm system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present subject matter.

What is claimed is:

1. A child safety system for use in a vehicle, the child safety system comprising:
   a seat portion;
   a child detector configured to detect a presence of a child in the seat portion; and
   an interface unit configured to couple the child detector to an alarm system of the vehicle, wherein, in response to the presence of the child in the seat portion, the interface unit is configured to prevent the alarm system from producing a confirmatory honk normally associated with securing the vehicle.

2. The child safety system of claim 1, wherein the child detector comprises at least one of a weight sensor, a weight-sensitive switch, and a pressure-activated switch.

3. The child safety system of claim 1, wherein the child detector comprises at least one of a motion detector, an infrared sensor, a buckle sensor, and a proximity detector.

4. The child safety system of claim 1, wherein the interface unit is further configured to cause the alarm system to produce an alternative notification, different from the confirmatory honk, wherein the alternative notification is normally associated with a problem preventing the alarm system from securing the vehicle.

5. The child safety system of claim 1, wherein the interface unit comprises a junction to a door or window sensor coupled to the alarm system.

6. The child safety system of claim 1, wherein the interface unit comprises at least one of:
   an electrical connection to a sensor input of the alarm system;
   a wireless connection to the alarm system;
   a junction to an existing sensor coupled to the alarm system; and
   a circuit for controlling an output device associated with the alarm system.

7. The child safety system of claim 1, wherein the interface unit comprises a transformer circuit configured to:
   receive, from the child detector, a signal indicative of the presence of the child;
   produce a first output when the child is present, and produce a second output when the child is not present; and
   provide either the first output or the second output to the alarm system based, at least in part, on the signal indicative of the presence of the child.

8. An alarm system for use in a vehicle, the alarm system comprising:
   at least one input circuit for coupling to a child detector associated with a child safety seat in the vehicle;
   at least one output circuit coupled to an apparatus for generating an alert;
   a receiver; and
   a controller configured to:
      receive, via the receiver, a command associated with securing the vehicle,
      receive, via the at least one input circuit, a signal indicative of a presence of a child in the child safety seat, and
      in response to the signal indicative of the presence of the child, prevent the alarm system from producing a confirmatory honk normally associated with securing the vehicle in response to the command.

9. The alarm system of claim 8, wherein the controller is further configured to:
   determine, from the signal, that the presence of the child exceeds a threshold wait time after the command is received, and
   cause, via the at least one output circuit, a notification when the presence of the child exceeds the threshold wait time.

10. The alarm system of claim 9, wherein the notification comprises an emergency alert message, and wherein the at least one output circuit is coupled to a network interface capable of transmitting the emergency alert message.

11. The alarm system of claim 10, wherein the network interface comprises at least one member of a group consisting of a cellular connection, satellite service connection, and wireless local area network connection.

12. The alarm system of claim 8, further comprising:
   a key sensor; and
   the controller further configured to:
      detect, via the key sensor, a removal of a key from an ignition of the vehicle, and
      cause, via the at least one output circuit, a preliminary alarm in response to the signal indicative of the presence of the child and in response to the removal of the key.

13. The alarm system of claim 12, further comprising:
   a delay trigger configured to receive a user activation, wherein the delay trigger comprises at least one of a button, a latch, and a sensor; and
   the controller further configured to
      temporarily silence the preliminary alarm in response to the user activation of the delay trigger.

14. A method comprising:
    detecting, at an alarm system of a vehicle, a command associated with securing the vehicle;
    determining whether a child detector detects a presence of a child occupying a child safety seat in the vehicle; and
    in response to determining that the child detector detects the presence of the child, preventing the alarm system from producing a confirmatory honk normally associated with securing the vehicle in response to the command.

15. The method of claim 14, wherein the command is detected responsive to a user activation of a fob associated with the alarm system.

16. The method of claim 14, further comprising:
    determining that the child detector does not detect the presence of the child occupying the child safety seat; and
    securing the vehicle in response to determining that the child detector does not detect the presence of the child.

17. The method of claim 14, further comprising:
    determining that the child detector detects the presence of the child for more than a threshold wait time; and
    causing a notification, in response to determining that the child detector detects the presence of the child for more than the threshold wait time.

18. The method of claim 17, wherein causing the notification comprises at least one of:
    sounding an audible alarm;
    transmitting an emergency alert message; and
    broadcasting a distress signal.

19. A method comprising:
    detecting, at an alarm system of a vehicle, removal of a key from an ignition of the vehicle;
    determining whether a child detector detects a presence of a child occupying a child safety seat in the vehicle;
    causing, by the alarm system, a preliminary alarm in response to determining that the child detector detects the presence of the child and in response to detecting the removal of the key;
    detecting a user activation of a delay trigger associated with silencing the preliminary alarm, wherein the delay trigger comprises at least one of a button, a latch, and a sensor; and
    temporarily silencing the preliminary alarm in response to detecting the user activation of the delay trigger.

20. The method of claim 19, further comprising:
    causing a notification after causing the preliminary alarm for a threshold wait time.

21. The child safety system of claim 1,
    wherein, in response to the presence of the child in the seat portion, the interface unit is further configured to disable the alarm system from securing the vehicle.

22. The alarm system of claim 10, wherein the notification is sent to a wearable electronic device.

* * * * *